Patented Aug. 5, 1947

2,425,223

UNITED STATES PATENT OFFICE 2,425,223

PRODUCTION OF AMIDINE SALTS

Harry James Barber, Romford, England, assignor to May & Baker Limited, Dagenham, England, a British company No Drawing. Original application August 27, 1943, Serial No. 500,293. Divided and this application February 15, 1945, Serial No. 578,116. In Great Britain July 27, 1942

Section 1, Public Law 690, August 8, 1946.
Patent expires July 27, 1962

8 Claims. (Cl. 260—501)

This invention is for improvements in or relating to the preparation of amidine salts, especially salts of diamidines of the aromatic series. This is a division of my co-pending application Serial No. 500,293, filed August 27, 1943.

The most commonly known amidine salts, the hydrochlorides, have usually been prepared by treating the corresponding nitrile with anhydrous alcoholic hydrochloric acid to form the corresponding imino-ether hydrochloride which has then been converted into the amidine hydrochloride by treatment with ammonia. In the case, for example, of the di-hydrochlorides of diamidines, especially diamidines of the aromatic series, it was found necessary to employ large excess quantities of anhydrous hydrochloric acid in order to cause the conversion of the nitrile into imino-ether hydrochloride to proceed at a reasonable speed and to completion. This frequently led to difficulties as it was necessary to remove at least the greater part of the excess of acid in order satisfactorily to carry out the next stage (conversion of imino-ether hydrochloride into amidine hydrochloride). Thus, when the conversion of nitrile to imino-ether hydrochloride was carried out in a diluent, and this hydrochloride did not separate, it was necessary to pump off considerable quantities of hydrochloric acid gas, which is objectionable for industrial scale operation.

Even when the imino-ether hydrochloride did separate, it often contained considerable quantities of free hydrochloric acid which was removable but slowly. For this reason and since also these imino-ether hydrochlorides are unstable, being decomposed by alcohol, it has been necessary to use a considerable excess of anhydrous alcoholic ammonia (e. g., 10 molecules of ammonia for each imino-ether group) for the step of converting the imino-ether hydrochlorides into the corresponding amidine hydrochlorides.

The production of other amidine salts than the hydrochlorides has involved the same difficulties since these other salts have hitherto been prepared either directly from the hydrochloride or from the amidine base, itself prepared from the hydrochloride.

It has now been discovered that the foregoing disadvantages are avoided if, instead of converting the imino-ether hydrochlorides directly into the corresponding diamidine hydrochlorides, the imino-ether hydrochlorides are converted into the corresponding imino-ether bases and the latter then treated with an ammonium salt. By working in this way, it is possible to obtain not only amidine hydrochlorides but also any other desired amidine salt. The imino-ether bases are more stable than their hydrochlorides and in many cases are well-defined, crystalline substances which may be re-crystallised from a number of organic solvents.

The process of the present invention for the production of amidine salts of an acid therefore comprises causing reaction between an imino-ether base (corresponding to the amidine) and an ammonium salt of the said acid thereby to produce the amidine salt of the said acid.

It should be understood that the expression "imino-ether base corresponding to the amidine" as used in this specification and in the appended claims includes any imino ether having the formula of the amidine in question in which the amidine radical —C(=NH)NH$_2$ is replaced by the imino-ether radical —C(=NH)OR where R is any desired substituent for example a methyl, ethyl or β-phenylethyl radical.

This process is particularly applicable to the production of salts of aromatic diamidines having the general formula Am. B. X. B. Am wherein Am represents the amidine group, B represents an aromatic nucleus and X represents: (a) a direct linkage, or (b) an alkane chain (CH$_2$)$_n$ where $n$ is an integer from 1 to 12 in which one or more of the CH$_2$ groups may be replaced by an oxygen or sulphur group or an NH group, or (c) a —CR$_1$=CR$_2$— group in which R$_1$ and R$_2$ may be the same or different and represent hydrogen atoms or alkyl, aralkyl or aryl groups. Diamidines of this type are described in United States Patents Nos. 2,277,861, 2,277,862 and 2,204,983 and application S. No. 426,603.

The imino-ether bases employed as starting material may be obtained from their hydrochlorides (prepared in conventional manner). Thus, for example, the crude imino-ether hydrochlorides of the class corresponding to the aromatic diamidines having the foregoing general formula can be readily converted to the free imino-ether bases by suspending them in an inert solvent (chloroform is particularly suitable) and then adding, with good stirring and adequate cooling. e. g., by the addition of crushed ice, sufficient aqueous caustic soda solution to make the reaction mixture alkaline to phenolphthalein. The free base liberated, rapidly dissolves in the chloroform layer, which is separated from the aqueous layer and is thereafter washed and dried. The free bases obtained on evaporation of the chloroform are, in many cases, well-defined crystalline substances, which may be recrystallised from a number of organic solvents, of which benzene has been found most generally suitable.

It is not, however, essential to isolate the imino-ether hydrochloride (even in the crude state) before converting it into the imino-ether base. Thus, the imino-ether base can be obtained from the reaction mixture resulting from the usual process of preparing the hydrochloride (i. e., by saturating a solution or suspension of the nitrile, containing an anhydrous alcohol, with dry hydrochloric acid gas, and allowing to stand for the time required to complete the reaction) by treating this reaction mixture in the manner described above for the crude imino-ether hydrochloride. When, as is sometimes the case, the said anhydrous alcohol is employed in conjunction with an inert solvent, such as chloroform, the imino-ether base can be obtained from the reaction mixture simply by adding, with good stirring, a considerable excess of aqueous caustic soda solution, with cooling by addition of crushed ice. The separation of the free base is effected in the manner described above.

In carrying the present invention into effect, the imino-ether base obtained in the manner described above may be converted to any amidine salt by treatment with an appropriate ammonium salt, preferably in a suitable solvent medium. It has been found that the reaction can be carried out quite smoothly in aqueous alcoholic solution or suspension.

Suitable imino-ethers are, for example, those corresponding to the imino-ether hydrochlorides specified in United States Patents Nos. 2,277,861, 2,277,862 and 2,204,983 and application S. No. 426,603. The ammonium salt employed is, of course, that corresponding to the amidine salt desired. Typical examples are ammonium chloride, ammonium beta-hydroxy-ethane sulphonate, ammonium beta-hydroxy-propane sulphonate, ammonium lactate and ammonium methane sulphonate.

It is convenient to dissolve the ammonium salt of the acid in water and the imino-ether base in an alcohol such as ethyl alcohol, the proportions of each being so adjusted that both components remain in solution after mixing at about 50° to 60° C. The amidine salt may or may not separate from the reaction mixture after some four or five hours, according to the solubility of the amidine salt. If it is soluble, it is convenient to concentrate to an appropriate degree and to crystallise by the addition of excess alcohol or acetone. The temperature range of 50° to 80° C. is preferred in practice but lower temperatures may also be used. Care should be taken to avoid substantially higher temperatures, i. e., up to boiling point such as would result in the loss from the reaction mixture of any substantial amount of ammonia required for the reaction.

A modification of the process hereinbefore defined and which is within the scope of this invention comprises reacting the imino-ether base with a salt of an organic base. Salts of primary or secondary amines can be employed, for example ethylamine lactate and piperidine hydrochloride.

An important advantage of the present invention lies in its applicability to the production of any amidine salt, whereas procedures hitherto described have yielded only the hydrochlorides from which the other salts have had to be prepared. Moreover, as has already been pointed out, the production of amidine hydrochlorides by the process of the present invention results in the elimination of disadvantages hitherto experienced.

The process of the present invention is illustrated by the following examples:

*Example I*

250 grams of 4:4'-dicyano-alpha-gamma-diphenoxy propane were suspended in 1200 ccs. of chloroform and 210 ccs. of ethyl alcohol and the mixture was saturated with dry hydrogen chloride at 0° C. After stirring for 14 days at 25° C. in a closed pressure vessel the reaction mixture was treated with 700 grams ice and stirred vigorously while 50% caustic soda was run in until strong alkalinity to phenolphthalein had been reached. The chloroform layer was separated, washed, dried and distilled. The di-imino-ether base was left as a white solid, M. P. 81–83° C. It is best crystallised from benzene but may be used without purification for preparation of the amidine salts.

Thus 200 grams of the di-imino-ether base were dissolved in 1100 ccs. of ethyl alcohol at 70° C. and 160 grams of ammonium-beta-hydroxyethane sulphonate dissolved in 150 ccs. of warm water were added. The mixture was held at 70–80° C. for 6 hours. The required alpha, gamma-diphenoxypropane- 4:4'-bis(carbonamidine)-di-beta-hydroxyethane sulphonate crystallised on cooling.

*Example II*

148 grams of imino-ether base prepared according to the foregoing Example II were dissolved in 600 ccs. of ethyl alcohol and 44 grams of ammonium chloride dissolved in 200 ccs. water were added. The solution was kept at 50–60° C. for 6 hours. The required di-amidine dihydrochloride separated on cooling the solution. It was identical with that described in Example 9 of United States Patent No. 2,277,861.

*Example III*

In a similar manner, alpha, epsilon-diphenoxypentane-4:4'-bis(carbonamidine) di-isethionate may be obtained from the corresponding dicyano compound.

*Example IV*

0.7 grams of alpha, gamma-diphenoxy-propane-4:4'-bis(carbonimino-$\beta$-phenyl ethyl ether) was suspended in 10 ccs. of ethyl alcohol and a solution of 0.4 gram of methane sulphonic acid neutralised with 2-N ammonia added. The mixture was kept at 35° C. for 24 hours. The di-iminoether gradually passed into solution and the product alpha, gamma-diphenoxy-propane-4:4'-bis(carbonamidine) di-methane-sulphonate crystallised on cooling the solution.

I claim:

1. Process according to claim 5 wherein the reaction is conducted at an elevated temperature below that at which any substantial quantity of ammonia is evolved from the reaction mixture.

2. Process according to claim 5 wherein both the ammonium salt of an acid and the di-imino-ether base are soluble in the said medium, and the reaction is conducted at a temperature between 50° and 80° C.

3. Process according to claim 5 wherein the medium is an aqueous alcoholic suspension, and the reaction is conducted at a temperature between 50° and 80° C.

4. Process according to claim 5 wherein the ammonium salt of an acid is dissolved in water and the di-imino-ether base is dissolved in an alcohol, the proportions of each being so adjusted that both components remain in solution on the solutions being mixed together at about 50° to 80° C., and thereafter mixing together the two solutions at a temperature within this range.

5. Process for the production of a salt of a symmetrical aromatic diamidine, which comprises reacting a symmetrical di-imino-ether base of the formula:

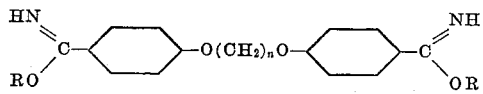

in which $n$ is an integer from 1 to 12 and in which R is selected from the group consisting of lower alkyl and aralkyl radicals, with an ammonium salt of an acid, in an aqueous alcoholic medium, and isolating the resulting salt from the reaction mixture.

6. Process for the production of alpha-gamma-diphenoxy-propane-4:4'-bis(carbonamidine)-di-beta-hydroxyethane sulphonate which comprises reacting, in an aqueous alcoholic medium, ammonium-beta-hydroxyethane sulphonate with alpha-gamma-diphenoxypropane-4:4'-(carbonimino ethyl ether) and isolating the said diamidine salt from the said reaction mixture.

7. Process for the production of alpha-gamma-diphenoxy-propane-4:4'-bis(carbonamidine)-dihydrochloride which comprises reacting, in an aqueous alcoholic medium, ammonium chloride with alpha-gamma-diphenoxypropane-4:4'-(carbonimino-ethyl ether) and isolating the said diamidine salt from the said reaction mixture.

8. Process for the production of alpha-epsilon-diphenoxy-pentane-4:4'-bis(carbonamidine) di-isethionate which comprises reacting, in an aqueous alcoholic medium, ammonium isethionate with alpha-epsilon-diphenoxy-pentane-4:4'-(carbonimino-ethyl ether) and isolating the said diamidine salt from the said reaction mixture.

HARRY JAMES BARBER.

REFERENCES CITED

The following references are of record in the file of this patent:

UNITED STATES PATENTS

| Number | Name | Date |
| --- | --- | --- |
| 2,204,983 | Ewins | June 18, 1940 |
| 2,277,861 | Ewins et al. | Mar. 31, 1942 |
| 2,277,862 | Ewins et al. | Mar. 31, 1942 |

FOREIGN PATENTS

| Number | Country | Date |
| --- | --- | --- |
| 116,718 | Australia | Mar. 12, 1943 |
| 559,015 | Great Britain | Feb. 1, 1944 |

OTHER REFERENCES

Beilstein, Handbuch der Org. Chem., IV ed., vol. IX, p. 271.

Beilstein, IV ed., vol. IX, supp., p. 121 (Knorr, B, 50, 235).